L. E. STROUP.
HORSE RELEASER.
APPLICATION FILED DEC. 15, 1914.
1,166,275. Patented Dec. 28, 1915.
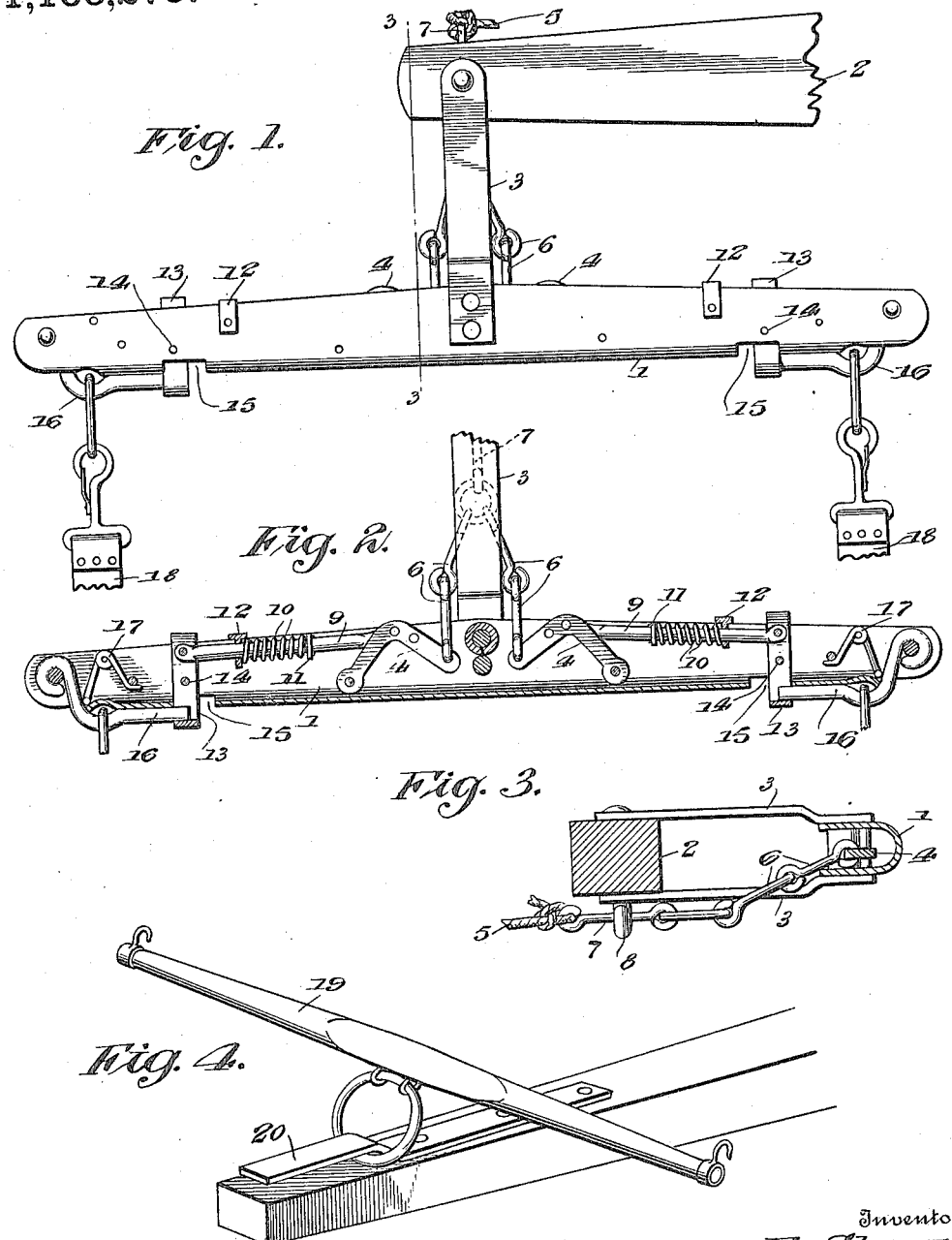

UNITED STATES PATENT OFFICE.

LUTHER E. STROUP, OF RIPLEY, MISSISSIPPI.

HORSE-RELEASER.

1,166,275.        Specification of Letters Patent.        Patented Dec. 28, 1915.

Application filed December 15, 1914. Serial No. 877,394.

*To all whom it may concern:*

Be it known that I, LUTHER E. STROUP, a citizen of the United States, residing at Ripley, in the county of Tippah and State of Mississippi, have invented new and useful Improvements in Horse-Releasers, of which the following is a specification.

This invention relates to horse releasers and the principal object of the invention is to provide a simple and efficient arrangement whereby the horse or horses may be released from the swingletree by the driver of the vehicle.

The device is also designed to facilitate hitching and unhitching of the horse.

Further objects of the invention will appear as the following description is read in connection with the accompanying drawing, which forms a part of this application, and in which:—

Figure 1 is a top plan view. Fig. 2 is a horizontal sectional view. Fig. 3 is a vertical transverse sectional view taken on the line 3—3 of Fig. 1. Fig. 4 is a perspective view showing one form of breast yoke release employed with this device.

In the specific embodiment of the invention I have shown a swingletree 1 carrying my invention and attached to an ordinary doubletree 2 by means of the links 3. The swingletree as shown is constructed of channel iron and has pivotally mounted therein upon opposite sides of the links 3, the bell crank levers 4, to the terminal end of one leg of which is connected the release strap or rope 5 by means of the links 6 and connecting rod 7, the latter arranged to pass through an eye 8 on the bolt connecting the links 3 with the doubletree. The opposite terminal of the legs of each bell crank lever is pivoted to the swingletree, as shown, and connected to the intermediate point of each bell crank is an actuating rod 9 which is surrounded by a spiral spring 10, one end of which abuts a collar 11 keyed to the rod and the opposite end of which abuts a clip 12 straddling the rod and secured to the swingletree, as shown. The outer terminal of the actuating rod 9 is pivoted to the lower end of a yoke-shaped catch 13 which is in turn pivoted intermediate its length, as shown at 14, to the swingletree, and extends through an opening 15 formed in the face of said swingletree. This yoke-shaped catch is adapted to engage over the free terminal of a locking bar 16 pivoted to the swingletree 1 and being actuated by a coiled spring 17 so that when its free end is released from the catch it will be turned upon its pivot bolt to release the tug or trace 18 therefrom. When the release rod or strap is given a sharp, quick pull by the driver or operator both bell crank levers are simultaneously turned upon their pivot points and the release rods 9 are projected in opposite directions toward the outer ends of the swingletree. The forward ends of the yoke catches are pushed toward each other by this action, thus releasing the free end of the bars 16 which are then actuated outwardly by the springs 17, thus releasing the tugs or traces.

In using the device for double teams it is necessary that the breast yoke 19 be readily freed from the pole whether the pole be a drop or rigid pole and to this end there is attached to the outer end of the pole a rectangular arm 20 which receives the ring in the center of the breast yoke, as shown. This ring, of course, is normally held against the shoulder of the rectangular plate and is readily pulled off the unobstructive outer end when the horses are unhitched. By employing the same type of connector to the breeching strap the device may be conveniently adapted to the shafts of a buggy or other similar vehicle.

What is claimed is:—

In a horse releaser comprising a channeled swingletree, substantially U-shaped in cross section and formed with openings adjacent the opposite ends thereof, bell crank levers pivotally secured to the inner wall of said swingletree, catches pivotally secured to said swingletree and passing through said openings, clips secured to the upper edge of said swingletree, actuating rods pivotally connecting the catches with the bell crank lever and extending through said clips, tug hooks pivotally secured within said swingletree and having their free ends disposed within the catches, and means for actuating said bell crank levers to release the catches from the tug hooks.

In testimony whereof I affix my signature in presence of two witnesses.

LUTHER E. STROUP.

Witnesses:
     JAMES DUNCAN,
     L. H. JOHE.

Copies of this patent may be obtained for five cents each, by addressing the "Commissioner of Patents, Washington, D. C."